(12) United States Patent  
Diaz Fuente

(10) Patent No.: US 8,503,581 B2  
(45) Date of Patent: Aug. 6, 2013

(54) ENCODING AND DECODING METHOD FOR TRANSMITTING AND ESTIMATING MULTIPLE SIMULTANEOUS CHANNELS

(76) Inventor: Vicente Diaz Fuente, Madrid (ES)

( * ) Notice: Subject to any disclaimer, the term of this patent is extended or adjusted under 35 U.S.C. 154(b) by 331 days.

(21) Appl. No.: 12/920,870

(22) PCT Filed: Nov. 24, 2008

(86) PCT No.: PCT/ES2008/000733  
§ 371 (c)(1),  
(2), (4) Date: Sep. 3, 2010

(87) PCT Pub. No.: WO2009/112601  
PCT Pub. Date: Sep. 17, 2009

(65) Prior Publication Data  
US 2011/0002407 A1    Jan. 6, 2011

(30) Foreign Application Priority Data  
Mar. 14, 2008  (ES) .................................. 200800754

(51) Int. Cl.  
*H04L 27/06*  (2006.01)

(52) U.S. Cl.  
USPC ........... 375/340; 375/260; 375/267; 375/295; 375/299; 375/316; 375/343; 375/347; 375/349; 375/350; 455/101; 455/132; 455/500; 455/562.1; 370/334; 370/464; 370/480; 341/173; 341/180

(58) Field of Classification Search  
USPC .................. 375/260, 267, 295, 299, 316, 340, 375/343, 347, 349, 350; 455/101, 132, 500, 455/562.1; 370/334, 464, 480; 341/173, 180  
See application file for complete search history.

(56) References Cited

U.S. PATENT DOCUMENTS

2007/0041311 A1 * 2/2007 Baum et al. .................. 370/208  
2008/0298502 A1 * 12/2008 Xu et al. ...................... 375/299

FOREIGN PATENT DOCUMENTS

WO    WO2005107200 A1    11/2005  
WO    WO2005122513 A1    12/2005

OTHER PUBLICATIONS

International Search Report in corresponding PCT/ES2008/000733 dated May 7, 2009.

* cited by examiner

*Primary Examiner* — Leon Flores

(57) ABSTRACT

An improved encoding and decoding method for the transmission and estimation of multiple simultaneous channels, thereby solving the problem of shortening the time required to measure the attenuation, absorption or distortion of signals passing through a predetermined medium.

3 Claims, 1 Drawing Sheet

ENCODING AND DECODING METHOD FOR TRANSMITTING AND ESTIMATING MULTIPLE SIMULTANEOUS CHANNELS

INVENTION PURPOSE

The invention referred herein is about an improved coding and decoding method based on the previous patent ("improved coding and decoding method with at least two pairs of orthogonal sequences," requested in Spain as 200603237 on Dec. 21, 2006). In the former patent, identification or transmission was made over two simultaneous channels using two pairs of complementary sequences.

In the improvement proposed, its use is extended to any number of channels. This method allows estimating a channel with multiple inputs (P) and multiple outputs (Q)—referred as MIMO—for any value of P and Q greater than or equal to 1. In this case, the estimation or transmission of data in the way described herein allows reducing the time of identification of any channel, which results very useful in medical imaging applications, spectrum analysis, electromagnetic analysis, natural resources surveys, data communication or any other application related with the identification of a means or channel.

BACKGROUND ART

The state of the art is summarized in the document of PCT 200603237, which is the only one known document that aims at solving the problem in such a way for two channels using two pairs of orthogonal complementary sequences.

Communication systems, spectrum analysis, RADAR, SONAR and other systems of characterization and identification transmit a signal that arrives—reflected or not—to the receiver after passing through a transmission means. This means acts as a linear filter with an impulse response in frequencies H ($\omega$) or temporary h[n]. In order to make the process of retrieving emitted information possible, in most communication systems it is essential to eliminating effects produced by the transmission means in the emitted signal s[n]. This process is known as equalization. The response in frequency can also be used to make a special analysis of the means and, thus, obtaining information of its physical properties.

The channel acts as a filter and distorts the signal. Noise, n[n], due to channel disruptions, thermal noise and other signals interfering with those emitted should be added as well. In conclusion, the signal received, r[n], can be modeled as follows:

$$r[n]=s[n]*h[h]+n[n] \quad (1)$$

Where * denotes the convolution operation.

By generalizing equation (1) for the case of P inputs and Q outputs, rejecting the term of noise n[n] by clarity, signals r[n] and s[n] are vectors of Q and P length respectively, and h[n] corresponds to a matrix of P×Q size, whose elements correspond to vectors of the functions of cross transference among each input and each output of the system.

Thus, the previous expression remains in the time domain as:

$$r[n]=s[n]*h_{P,Q}[n] \quad (2)$$

Where * is the convolution operator, 0 in the frequency domain as the product $$R=S \cdot H_{P,Q} \quad (3)$$

Where channel's transference matrices are:

$$H_{P,Q} = \begin{pmatrix} H_{1,1} & \ldots & H_{1,Q} \\ \ldots & H_{p,q} & \ldots \\ H_{P,1} & \ldots & H_{P,Q} \end{pmatrix} \quad h_{P,Q} = \begin{pmatrix} H_{1,1} & K & H_{1,Q} \\ M & O & M \\ H_{P,1} & L & H_{P,Q} \end{pmatrix} \quad (4)$$

For that, numerous identification methods perform a sequence emission with each of the transmitters separately to identify each coefficient of said transference matrix and thus avoiding mutual interference. Hence, identification time increases with the value of P, Q and the length of the channel to be identified.

The objective of the improvement proposed is to obtain all values of channel coefficients $H_{P,Q}$ or $h_{P,Q[N]}$ as fast as possible using the technology employed in the previous patent for two channels but extending it to multiple simultaneous channels.

Like the previous patent, the fundamental base is the use of complementary sequences properties, whose elements or sequences belonging to orthogonal families meet the following properties:

$$s_{i,j} \otimes s_{i',j'} = \phi_{s_{i,j}s_{i',j'}} \quad [k] = \frac{1}{L}\sum_{n=1}^{L} s_{ij}[n] \cdot s_{i',j'}[n+k] \quad (5)$$

$$SACF[k] = \sum_{j=1}^{M} \phi_{s_{i,j}s_{i,j}} \quad [k] = M \cdot \delta[k]$$

$$SCCF[k] = \sum_{j=1}^{M} \phi_{s_{i,j}s_{i',j}} \quad [k] = 0 \quad \forall k$$

Where $\otimes$ is the correlation operator, SACF is the sum of autocorrelation functions of set $S_i$ and SCCF is the sum of cross-correlations of two sets $S_i$ and $S_{i'}$; both sets are uncorrelated and formed by sequences $S_{i,j}$ corresponding to the sequence j-th of set $S_i$.

INVENTION PURPOSE

With the purpose of solving the problem of time referred in previous paragraph, this invention is developed in order to reduce the time necessary to identify the coefficients of the transference matrix.

And that is achieved, according to the new invention, by transmitting simultaneously coded sequences in a specific order, where mutual interferences among them are cancelled, making the identification of coefficients possible in a simultaneous way and, therefore, accelerating the estimation process.

Hence, this new process will allow reducing the time of acquisition in medical imaging systems, spectrum analysis, non-invasive chemical analysis, RADAR, SONAR, natural resources surveys, data communication, and every application requiring attenuation measurement, signal absorption or distortion when passing through a specific means.

DESCRIPTION OF DRAWINGS

In order to clarify the essence of the invention, two sheets of drawings including three figures are attached herein, where the following is described.

PREFERRED EMBODIMENT OF INVENTION

Figure 1:
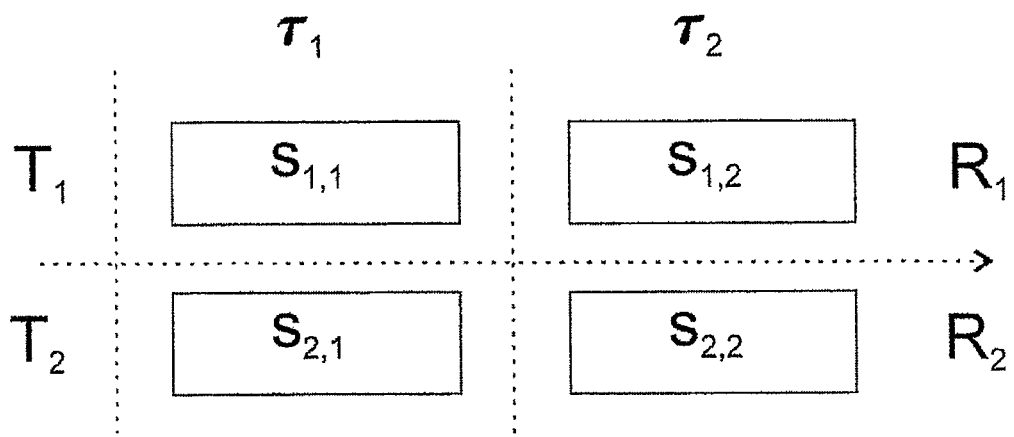
FIG. 1.—Schedule of emission and identification structure previously used for two channels, including:
Two transmitters T1 and T2.
Two receivers R1 and R2.
Time intervals $T_1$ and $T_2$, where correlations are evaluated for obtaining parameters.
Complementary sequences transmitted by each transmitter in the intervals defined by the process.
Figure 2:
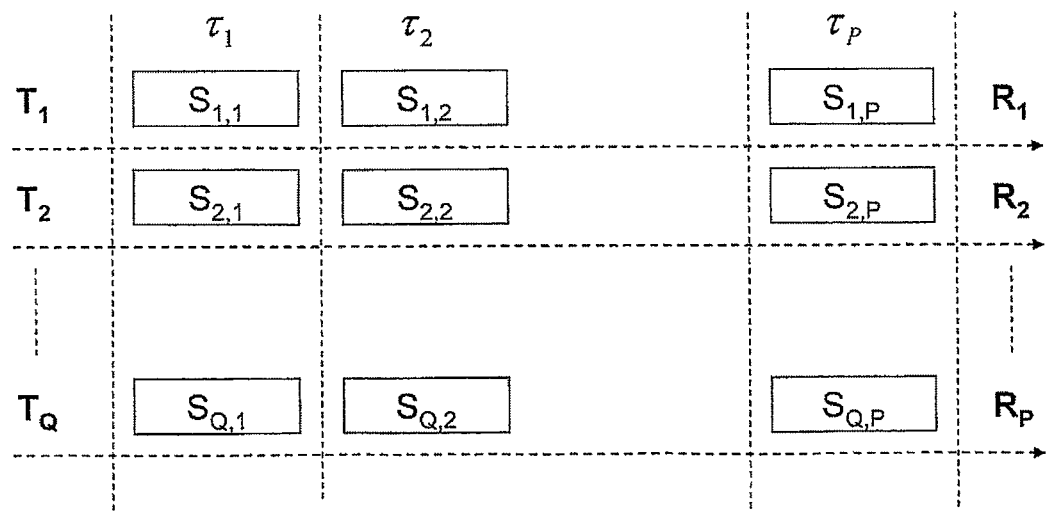
FIG. 2.—Schedule of the new emission and identification structure extended to P transmitters and Q receivers, including:
P transmitters T1 to TP.
Q receivers R1 to RQ.
P time intervals $T_1$ to $T_P$, where correlations are evaluated for obtaining corresponding parameters.
Complementary sequences transmitted by each transmitter in the intervals defined by the process.

The improved coding and decoding method for transmitting and estimating multiple simultaneous channels proclaimed in this invention is characterized by the employment of sets of orthogonal complementary sequences that create a coding preamble comprised of P emitters and perform the following operations described in FIG. 2:
 a) Simultaneous emission of the first sequence of the set of orthogonal sequences assigned to each transmitter by all transmitters.
 b) Followed by the emission of the second sequence of the set of orthogonal sequences assigned to each transmitter by all transmitters.
 c) Repetition of this process until transmitting P sequences of Q sets of orthogonal sequences assigned to each transmitter.

By applying the properties seen in (5) to signals received according to the preamble described in FIG. 2 and operating, the identification of transference matrix $h_{p,q}$ parameters in time is performed directly according to this expression:

$$M \cdot h_{p,q} = \sum_{k=1}^{M} r_q^{(k)} \otimes s_{p,k}; 1 \leq p \leq P; 1 \leq q \leq Q \qquad (6)$$

Where we find that:
 M.—Number of complementary sets of M sequences each and that are orthogonal with each other.
 $h_{p,q}$.—Impulse response (in time) between emitter p and receiver q.
 $r_q^{(k)}$.—Signal received in receiver q in interval $T_k$.
 $S_{p,k}$.—K-th sequence of set Sp inside orthogonal sequence sets among each other.

In that way, the time necessary to estimate P×Q coefficients of the transference matrix is reduced by Q due to the simultaneous transmission of Q transmitters.
 And that is possible because when transmitting in this order, mutual interferences of all transmitters and receivers are cancelled making the identification of coefficients possible in a simultaneous way, thus, accelerating the estimation process.
 Moreover, despite the fact it is not the direct objective of this improvement, there is a gain factor M according to expression (6), which allows reducing noise in the identification system proportionally to the number of sequences used.

On the other hand, filters necessary to perform the process only require additions and subtractions, since the elements of sequences used are values +1 and −1, which correspond to a sign change without products.
Finally, it can be demonstrated that filters' complexity is proportional to logarithm for base 2 of sequences' length.
Therefore, implementation advantages for the new process would be:
 1. Reduction in acquisition time.
 2. Increase in signal-noise ratio.
 3. There is no need to use products to perform neither correlation nor generating filters.
 4. Process complexity is reduced in relation to other procedures.

Despite the fact a specific embodiment of the invention has been described, it should be evident for specialized technicians that this invention can be made in other specific embodiments as long as the following claims are met.

The invention claimed is:
1. A method of identifying a transmission channel, the method comprising the steps of:
 assigning to each of P transmitters a set of orthogonal complementary sequences;
 operating the P transmitters during a first time period to transmit simultaneously through the transmission channel a first sequence of each of the sets of orthogonal complementary sequences;
 operating the P transmitters during a second time period following the first time period to transmit simultaneously through the transmission channel a second sequence of each of the sets of orthogonal complementary sequences;
 repeatedly operating the P transmitters during each of a number of subsequent time periods following the second time period to transmit simultaneously through the transmission channel P subsequent sequences during each subsequent time period until P sequences of Q sets of orthogonal complementary sequences are transmitted through the transmission channel;
 operating Q receivers during the time periods to receive the transmitted orthogonal complementary sequences; and
 identifying the transmission channel based on the received transmitted orthogonal complementary sequences, wherein each of P and Q is an integer, wherein P is greater than two and Q is greater than 2, wherein the step of identifying the transmission channel based on the received transmitted orthogonal complementary, sequences comprises the step of identifying parameters of a transference matrix hp,q in accordance with the following equation:

$$M \cdot h_{p,q} = \sum_{k=1}^{M} r_q^{(k)} \otimes s_{p,k}; 1 \leq p \leq P; 1 \leq q \leq Q$$

wherein $h_{pq}$ is the transference matrix, M is the number of orthogonal complementary sequence sets, $r_q^{(k)}$ is the signal received at receiver q at time interval $T_k$, and $S_{p,k}$ is the K-th sequence of orthogonal complementary sequence set $S_p$.

2. The method of claim 1, wherein each of the orthogonal complementary sequences is comprised of elements +1 and −1.

3. The method of claim 1, wherein each of the orthogonal complementary sequences is comprised only of elements +1 and −1.

* * * * *